(12) United States Patent
Blomstedt et al.

(10) Patent No.: US 11,067,812 B2
(45) Date of Patent: Jul. 20, 2021

(54) WAVEGUIDE DISPLAY ELEMENT WITH REFLECTOR SURFACE

(71) Applicant: DISPELIX OY, Espoo (FI)

(72) Inventors: Kasimir Blomstedt, Espoo (FI); Mikhail Erdmanis, Espoo (FI)

(73) Assignee: DISPELIX OY, Espoo (FI)

( * ) Notice: Subject to any disclaimer, the term of this patent is extended or adjusted under 35 U.S.C. 154(b) by 0 days.

(21) Appl. No.: 17/041,301

(22) PCT Filed: Mar. 11, 2019

(86) PCT No.: PCT/FI2019/050190
§ 371 (c)(1),
(2) Date: Sep. 24, 2020

(87) PCT Pub. No.: WO2019/185978
PCT Pub. Date: Oct. 3, 2019

(65) Prior Publication Data
US 2021/0055562 A1    Feb. 25, 2021

(30) Foreign Application Priority Data
Mar. 28, 2018   (FI) ...................................... 20185293

(51) Int. Cl.
*G02B 27/01* (2006.01)
*G02B 5/18* (2006.01)
*G02B 27/00* (2006.01)
*G02B 27/42* (2006.01)

(52) U.S. Cl.
CPC ....... *G02B 27/0172* (2013.01); *G02B 5/1819* (2013.01); *G02B 27/0081* (2013.01); *G02B 27/4272* (2013.01)

(58) Field of Classification Search
CPC ............ G02B 27/0172; G02B 27/0081; G02B 27/4272; G02B 5/1819
See application file for complete search history.

(56) References Cited

U.S. PATENT DOCUMENTS

2015/0241704 A1*   8/2015   Schowengerdt ...... G06T 19/003
                                                              345/633

FOREIGN PATENT DOCUMENTS

WO    WO-2017120326 A1 *   7/2017   ......... G02B 27/0172

* cited by examiner

*Primary Examiner* — Kimberly N. Kakalec
(74) *Attorney, Agent, or Firm* — Maschoff Brennan

(57) ABSTRACT

A waveguide display element includes a waveguide comprising two opposing main surfaces, a first optical element arranged at a first location of the waveguide, a second optical element arranged at a second location of the waveguide, and at least one reflector surface extending between said main surfaces and adapted to reflect light rays propagating within the waveguide. The reflector surface is adapted to redirect light rays from the first optical element to the second optical element.

20 Claims, 2 Drawing Sheets

WAVEGUIDE DISPLAY ELEMENT WITH REFLECTOR SURFACE

FIELD OF THE INVENTION

The invention relates to waveguide displays which can be used in personal display devices, such as head-mounted displays (HMDs) and head-up displays (HUDs). Such displays typically comprise a waveguide and at least one diffractive optical element, such as a grating, arranged onto or into the waveguide.

BACKGROUND OF THE INVENTION

Waveguides are key image-forming elements in many modern personal display devices. The image to be displayed can be coupled into and out of the waveguide, as well as modified within the waveguide, using diffractive gratings arranged in the main plane of the waveguide, typically on its surface. For example, there may be provided an in-coupling grating for coupling an image from a projector into the waveguide, an exit pupil expander (EPE) grating for expanding the light field in one or more in-plane dimensions of the waveguide, and an out-coupling grating which couples the light field out of the waveguide to the user's eye. Gratings can be designed to perform optical functions inside the waveguide, just like the exit pupil expansion function of an EPE. However, gratings require considerable surface area, which is very limited in practical display devices, in near-to-the-eye devices (NEDs).

US2015/0241704 A1 discloses waveguides with additional reflector surfaces inside the waveguide, which are suitable tilted or curved, when seen in a cross-sectional plane of the waveguide. The reflector surfaces facilitate out-coupling of light from the waveguide.

Known arrangements can be used to modify the light field inside the waveguide up to certain limits. However, in several occasions, these arrangements are too limited and/or take too much surface area on the waveguide.

SUMMARY OF THE INVENTION

It is an aim of the invention to overcome at least some problems of the prior art. A particular aim is to provide a solution that saves surface area of the waveguide.

This aim is achieved by the invention as defined in the independent claims.

According to one aspect, the invention provides a waveguide comprising two opposing main surfaces, a first optical element arranged at a first location of the waveguide, a second optical element arranged at a second location of the waveguide, and at least one reflector surface extending between said main surfaces and adapted to reflect light rays propagating within the waveguide. The reflector surface is adapted to redirect light rays from the first optical element to the second optical element.

In some embodiments, the reflector surface is a planar surface, either perpendicular or moderately (e.g. 1-25 degrees) tilted with respect to the waveguide plane or tilted with respect to that plane.

Generally speaking, the present reflector surface has a shape and orientation in which the surface is capable of redirecting propagating rays within the waveguide, as opposed to coupling light into or out of the waveguide through one of the main surfaces thereof.

In alternative embodiments, the reflector surface is curved in the waveguide plane (when inspected in the plane of the main surfaces) and/or a plane perpendicular to that plane. Thus, it may serve as a mirror lens.

The reflector surface may be a fully or partially reflective structure, such as a reflective unitary material layer, such as a metal coating, reflective grating structure or reflective thin-layer stack, inside or at a lateral edge of the waveguide.

The optical elements may be diffractive optical elements (DOEs) of any type, capable of performing light in-coupling, exit pupil expansion or out-coupling functions, for example, or other elements such as light sources, display panels, or other reflective surfaces.

The invention offers significant benefits. It is possible to perform optical functions inside the waveguide without in-plane gratings that take considerable amount of space on the waveguide. Space is very limited in particular in practical virtual reality (VR) and augmented reality (AR) applications, in which the aim is usually to maximize the field of view and where the out-coupling grating takes a significant portion of the waveguide area.

Practical examples include compression and decompression of the light field, exit pupil expansion, and integration of additional components to the waveguide. These applications are exemplified in detail later.

The dependent claims are directed to selected embodiments of the invention.

Next, embodiments of the invention and advantages thereof are discussed in more detail with reference to the attached drawings.

DETAILED DESCRIPTION OF EMBODIMENTS

The invention is discussed below with the aid of embodiments in which the reflector surface is at each point thereof perpendicular to the waveguide plane and either planar or curved when seen in the waveguide plane. However, the same principles can be applied to such embodiments where the surface is tilted or curved in the cross-sectional plane of the waveguide. If tilted or curved, the tilting or curvature is moderate, meaning that the surface will not substantially out-couple propagating rays that hit the surface through the main surface of the waveguide, but redirects them between optical elements on the waveguide.

The change in angle distribution of light, i.e. the optical function of the reflector surface, is determined by the shape of the reflector surface and, in the case of grating-based or thin-film stack reflectors, the grating or thin-film structure.

Figure 1A:
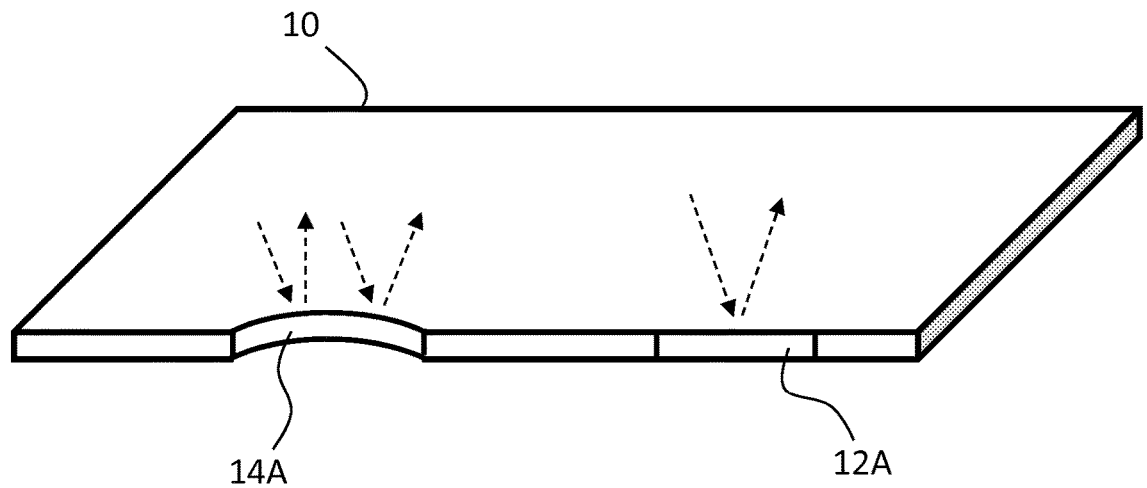
FIG. 1A shows in perspective view a waveguide comprising two exemplary reflector surfaces positioned on an outer edge thereof.
Figure 1B:
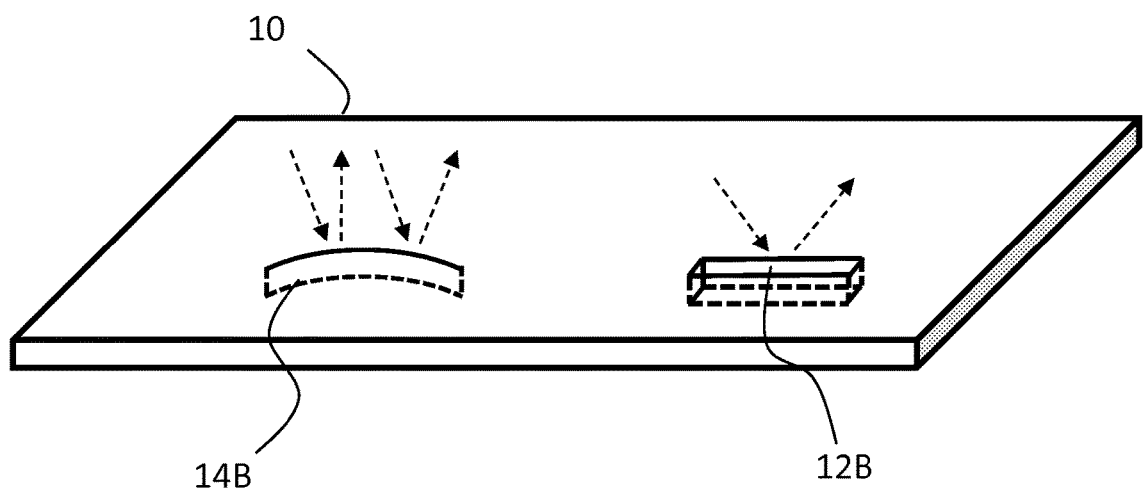
FIG. 1B shows in perspective view a waveguide comprising two exemplary reflector surfaces positioned inside the waveguide.

With reference to FIGS. 1A and 1B, in some embodiments, there is provided a waveguide display element comprising a planar waveguide 10 comprising two opposing main surfaces extending essentially in a first plane. In another example, the waveguide is curved, the main surfaces however being mutually parallel at each lateral location.

In some embodiments, the reflector surface is arranged on the outer edge of the waveguide 10, as shown in FIG. 1A. The plane of the edge is perpendicular to the plane of the main surfaces of the waveguide 10.

In one example, the edge reflector surface is a planar surface 12A, occupying a whole edge or part of an edge of the waveguide 10.

In another example, the edge reflector surface is a curved surface 14A when inspected in the plane of the main surfaces of the waveguide. The tangent of the curved surface 14A remains within the waveguide.

The exact shape of a curved surface may be e.g. circular, elliptic or parabolic, or any other suitable shape, depending on the required optical function.

In both examples, the edge reflector surface 12A, 14A is capable of reflecting adapted to reflect light rays propagating within the waveguide between said main surfaces via total internal reflections, as visualized by the dashed arrows.

In some embodiments, like shown in FIG. 1B, the reflector surface 12B is located on an inner edge surface, i.e. surface of a void within the waveguide. This way, located within the waveguide at a distance from said outer edge surface, the reflector surface may be used to perform optical functions inside the waveguide. Positioning of the reflector surface is therefore very flexible.

In some embodiments, the reflector surface is arranged at a distance from outer (and optional inner) edge surfaces as an embedded optical surface 14B. That is there does not necessarily need to be a void inside the waveguide although this may simplify manufacturing.

In FIG. 1B, the inner edge reflector surface 12B is a straight surface and the embedded reflector surface 14B a curved surface, by way of example only. Any combination of placements/production methods and shapes is possible.

In some embodiments, the reflector surface comprises a grating, whose grating plane is parallel to the reflector surface. In the case of a reflector surface perpendicular to the waveguide plane, the grating vector of the grating is typically parallel to the plane of the main surfaces. One-dimensionally grated gratings are typical, although two-dimensional gratings capable of performing a more complex function are not excluded.

In some embodiments the reflector surface comprises a reflective layer, such as a metal layer. The layer can be produced as a coating layer on an outer or inner edge, or embedded into the waveguide by some other technique known per se.

In some embodiments the reflector surface comprises a thin-film stack of at least two different materials having different indices of refraction.

In one embodiment, there is provided a thin-film stack and a reflective coating layer applied on top of the thin-film stack. The stack may serve for example as an absorbing filter for a predefined wavelength range and angle of incidence, or an element capable of inducing phase shifts in a controlled manner.

There may be one or more reflector surfaces of the same or different kind and serving for the same or different purpose in a single waveguide.

In some embodiments, the waveguide comprises at least two separate grating areas typically arranged on at least one of the main surfaces thereof and the reflector surface is adapted to redirect light rays propagating between the grating areas.

In one specific example, the waveguide comprises an exit pupil expander grating area and an out-coupling grating area, and there are one or more reflector surfaces arranged optically between the exit pupil expander grating area and the out-coupling grating area.

In some embodiments, the reflector surface is adapted to carry out a field-of-view compression or decompression optical function for a set of light rays representing an image coupled into the waveguide.

Figure 2:
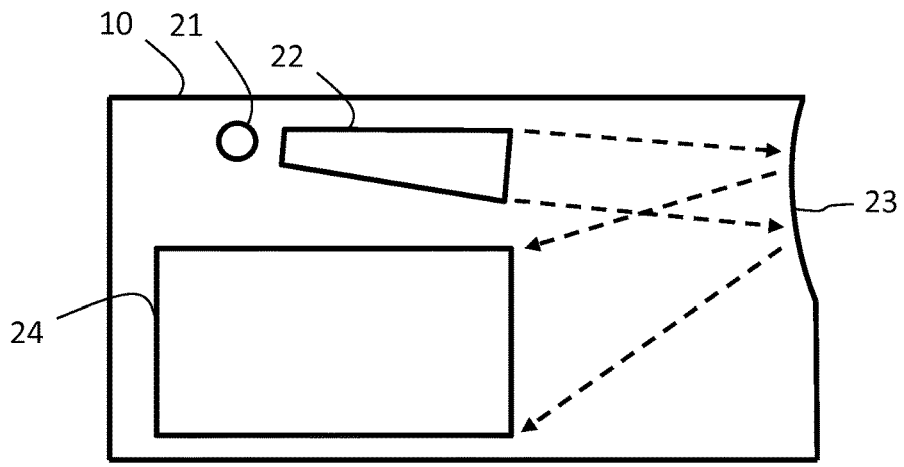
FIGS. 2-4 illustrate top views of waveguide element for various practical applications of the invention.

FIG. 2 shows an example of such arrangement. The waveguide 10 comprises an in-coupling grating 21 adapted to couple light from the outside of the waveguide 10 into the waveguide as propagating light. The light is directed from the in-coupling grating 21 to an exit pupil expander (EPE) grating 22, which expands the light field in at least one, typically two lateral dimensions. From the EPE grating 22, the light is directed to a curved reflector surface 23. The surface 23 forms a convex mirror, which redirects the incoming light rays towards an out-coupling grating 24 (or a further EPE), at the same time decompressing the light field.

The benefit of the arrangement of FIG. 2 is that initial light field expansion can be carried out at lesser space at the EPE 22.

Instead of decompression, the compression of the light field can be carried out using a concave reflector surface.

In some embodiments, the waveguide comprises an in-coupling grating area and an out-coupling grating area, and the reflector surface is arranged optically between the in-coupling grating area and the out-coupling grating area.

Figure 3:
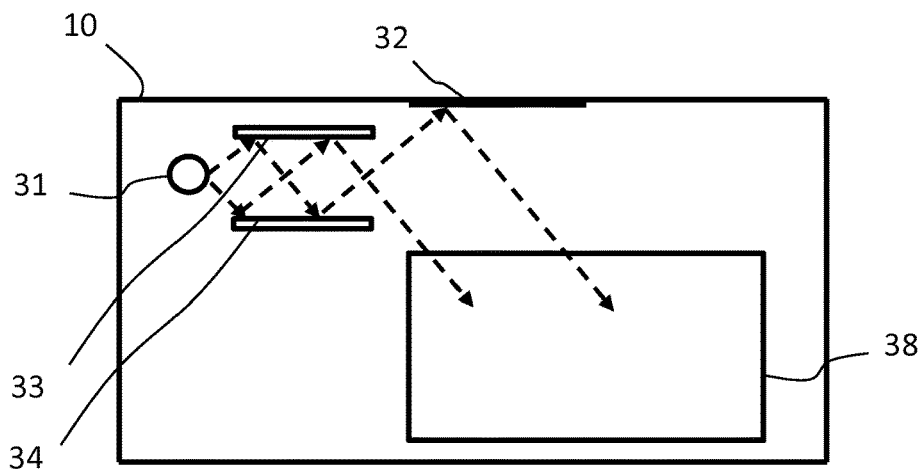

FIG. 3 shows an example of such arrangement. The waveguide 10 comprises an in-coupling grating 31 adapted to couple light from the outside of the waveguide 10 into the waveguide as propagating light. The light is directed from the in-coupling grating 31 to an opposing pair of reflector surfaces 33, 34, which expand the light field before directed to an out-coupling grating 38. An additional reflector surface 32 may be provided on the side of the element to prevent escaping of light rays bounced away from the out-coupling grating 38.

In some embodiments, the waveguide comprises an attached or integrated image source arrangement and at least one diffractive grating, and the reflector surface is adapted to redirect light rays propagating within the light image source arrangement and/or between the image source arrangement and the diffractive grating. Further the image source arrangement may comprise a light source element integral with the waveguide and a display panel integral with the waveguide, wherein the reflector surface is adapted to redirect light rays propagating between the light source element and the display panel.

Figure 4:
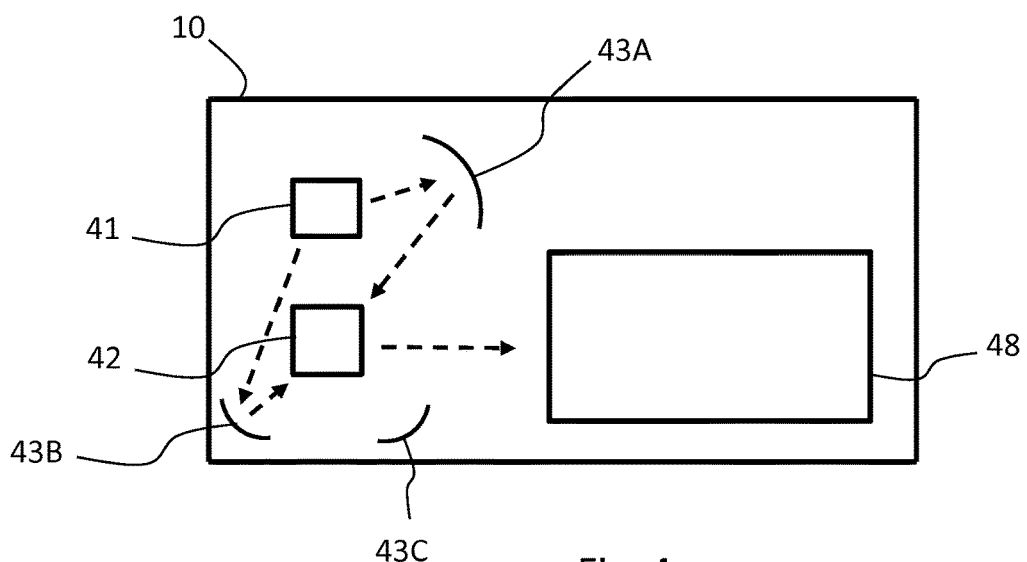

FIG. 4 shows an example of such arrangement. The lightguide 10 comprises an integral light source element 41 and an integral display panel element 42. The is also provided a plurality of reflector surfaces 41A-C, positioned so as to redirect light rays inside the waveguide from the light source to the projector in desired angles and with desired distribution. Together the light source 41, display panel 42 and reflector surfaces 43A-C form an integral image projector, from which light is further directed to an out-coupling grating 48.

According to one additional aspect, there is provided a waveguide comprising two opposing main surfaces, a first optical element arranged at a first location of the waveguide, and at least one reflector surface extending between said main surfaces perpendicular to the main surfaces and adapted to couple light into or out of the waveguide, in particular though an edge surface thereof, by reflecting propagating light rays to or from said first optical element. The reflector surface may be planar or curved in the waveguide plane. As concerns the practical implementation and positioning of the reflector surface, the principles discussed above apply to this aspect too.

Aspects and embodiments discussed above may be freely combined. For example, there may be a plurality of reflector surfaces of the same or different kinds and between the same or different first and second optical elements.

The waveguide element can be used in a personal see-through display device, such as a head-mounted display device, like a near-to-the-eye device or head-up display device.

CITATIONS LIST

Patent Literature

US 2015/0141704 A1

The invention claimed is:

1. A waveguide display element comprising:
a waveguide comprising two opposing main surfaces,
a first diffractive optical element arranged at a first location of the waveguide,
a second diffractive optical element arranged at a second location of the waveguide, and
a plurality of curved reflector surfaces including at least one reflector surface extending between said main surfaces and adapted to reflect light rays propagating within the waveguide, wherein the at least one reflector surface is adapted to redirect light rays from the first diffractive optical element to the second diffractive optical element, wherein: the at least one reflector surface is curved when inspected in the plane of said main surfaces, and
the plurality of curved reflector surfaces are of the same or different kinds and arranged between the same or different first and second diffractive optical elements.

2. The element according to claim 1, wherein the at least one reflector surface is perpendicular to said main surfaces.

3. The element according to claim 2, wherein the first and second diffractive optical elements comprise grating areas.

4. The element according to claim 2, wherein:
the waveguide comprises at least one outer edge surface extending between said main surfaces, and
the at least one reflector surface is located at said outer edge surface.

5. The element according to claim 2, wherein:
the waveguide comprises at least one outer edge surface extending between said main surfaces, and
the at least one reflector surface is located within the waveguide at a distance from said outer edge surface.

6. The element according to claim 1, wherein the at least one reflector surface is tilted with respect to the normal direction of said main surfaces, typically by 25 degrees at maximum.

7. The element according to claim 1, wherein the at least one reflector surface is curved when inspected in a plane perpendicular to said main surfaces.

8. The element according to claim 1, wherein:
the waveguide comprises at least one outer edge surface extending between said main surfaces, and
the at least one reflector surface is located at said outer edge surface.

9. The element according to claim 1, wherein:
the waveguide comprises at least one outer edge surface extending between said main surfaces, and
the at least one reflector surface is located within the waveguide at a distance from said outer edge surface.

10. The element according to claim 9, wherein:
the waveguide comprises at least one void having an inner edge surface extending between said main surfaces, and
the at least one reflector surface is located at said inner edge surface at a distance from said outer edge surface.

11. The element according to claim 1, wherein the at least one reflector surface comprises a grating capable of reflective diffraction of said light rays.

12. The element according to claim 1, wherein the at least one reflector surface comprises a reflective coating, such as a metal coating.

13. The element according to claim 1, wherein the at least one reflector surface comprises a thin-film stack.

14. The element according to claim 1, wherein:
the first diffractive optical element comprises an exit pupil expander grating area, and
the second diffractive optical element comprises an out-coupling grating area.

15. The element according to claim 1, wherein:
the first diffractive optical element comprises an in-coupling grating area, and
the second diffractive optical element comprises an out-coupling grating area.

16. The element according to claim 1, wherein:
the first diffractive optical element comprises a light source element integral with the waveguide, and
the second diffractive optical element comprises a display panel integral with the waveguide.

17. The element according to claim 1, wherein:
the first diffractive optical element comprises an attached or integrated image source component, and
the second diffractive optical element comprises a diffractive grating area, such an exit pupil expander grating area or an out-coupling grating area.

18. The element according to claim 1, wherein at least one of the first and second diffractive optical elements includes the at least one reflective surface.

19. The element according to claim 1, wherein the at least one reflector surface is adapted to carry out a field-of-view compression or decompression optical function for a set of light rays representing an image coupled into the waveguide.

20. A personal see-through display device, such as a head-mounted display device or head-up displace device, comprising a waveguide display element according to claim 1.

* * * * *